Patented Jan. 12, 1937

2,067,532

UNITED STATES PATENT OFFICE 2,067,532

METHOD OF TREATING A LIQUID MIXTURE CONTAINING OXYGEN DERIVATIVES OF HYDROCARBONS AND PRODUCTS THEREOF

Joseph Hidy James, Pittsburgh, Pa., assignor to C. P. Byrnes, trustee, Sewickley, Pa.

No Drawing. Application October 4, 1928, Serial No. 310,437

27 Claims. (Cl. 167—22)

I have previously disclosed methods of partially oxidizing hydrocarbons which are mainly aliphatic by admixing them in finely divided condition with oxygen usually in the form of a gas containing free oxygen, such as air; and passing the same through a heated reaction zone, preferably containing a catalyst, under conditions such as to obtain a condensed product containing different oxygen derivatives of hydrocarbons, each class containing similar bodies of different molecular weights.

My main method of oxidation is fully set forth in copending application Serial No. 272,567, filed January 22, 1919; U. S. Patent No. 1,697,653 granted January 1, 1929, and Serial No. 435,355, filed January 6, 1921. The products of such process usually contain alcohols, aldehyde-alcohols, aldehydes, acid anhydrides, inner and outer ethers, inner ester or lactone bodies and oxygenated organic acids; such compounds being both saturated and unsaturated and mixed with cyclated bodies of the naphthenic, terpenic and aromatic types (both oxygenated and non-oxygenated), and also with saturated or unsaturated straight aliphatic hydrocarbons.

My present invention relates to highly purifying such oxidized mixtures to remove all unsaturated hydrocarbons and doing this in a cheap and simple way.

In carrying out my method, I preferably treat the oxidized oil mixture, condensed or recovered from my vapor or gaseous phase oxidation, in its entirety, with a highly concentrated sulphuric acid, or a mixture of such and fuming sulphuric acid, substantially as set forth in my U. S. Patent No. 1,753,516, granted April 8, 1930. In this way, I attack the unsaturated bonds of the unsaturated hydrocarbons and hydrocarbon derivatives present, forming alkyl sulphates at the olefin linkages. Sulphonation takes place with many of the oxidized bodies and with the aromatic hydrocarbons.

After the sulphating and sulphonating are complete, I may neutralize the free sulphuric acids present and then hydrolize the sulphates to alcohols.

As an example, I may vaporize a gas oil fraction of a paraffin base petroleum, mix the same with air in measured amounts, and pass the mixture stream in contact with a catalyst, such as molybdenum oxides, vanadium oxides, etc., at a temperature somewhat below a red heat or below that of continuous self-sustained combustion. The resulting gas stream is condensed or recovered as an oily liquid mixture, such as above set forth. This total liquid mixture is then treated with about an equal volume of concentrated sulphuric acid containing about 25% of fuming sulphuric acid. Agitation is preferably used during addition to give rapid and thorough mixing since otherwise local overheating may occur in some local portions. During this acid addition, the temperature should be kept below about 40° to 45° C. After all the acid is added, the agitation should be continued for about one hour, showing that the reactions are finished. The excess sulphuric acid may then be neutralized without waiting for separation in layers; but as this involves waste of acid, I prefer to allow the mixture to stand and separate into two and sometimes three layers. The lowest layer (if three layers form) consists of excess sulphuric acid. The intermediate layer contains the major portion of the sulphated-sulphonated mixture, and the top layer consists mainly of unchanged hydrocarbons. This top layer may be drawn off and washed with water to extract any dissolved sulphated-sulphonated product, and this water solution or emulsion of part of the reaction product may be added to the intermediate layer, or it may first be "salted out" (by adding sodium chloride or sodium sulphate) and the product layer added to the intermediate layer.

The intermediate layer (or lower layer if two layers form) should now be washed, preferably with a saturated sodium sulphate or sodium chloride solution, to remove the excess sulphuric acid.

The reaction mixture is now neutralized and hydrolized. These two reactions take place when there is added either an excess of caustic soda or of ammonium hydroxide. The latter may be carried out by leading in a stream of ammonia gas. The caustic soda may be run in in the form of its 15% solution, for example, using an efficient agitating device. The caustic soda addition produces sodium salts of the sulphonic acids present, and accelerates the hydrolysis of the organic sulphates converting them into alcohols.

If ammonia or ammonium hydroxide is used, ammonium salts of the sulphonic acids are produced, and hydrolysis of the organic sulphates to alcohols.

The product mixture resulting from either of the foregoing treatments should usually be washed with saturated sodium sulphate or sodium chloride solution.

Instead of the ammonia or the caustic soda above, I may use a solution of sodium sulphide for the reaction after the sulphuric acid treatment. This was used in the form of a saturated solution of neutral sodium sulphide crystals (containing water of crystallization or hydration). This solution is added gradually with agitation, exactly in the same manner as the caustic soda solution above, that is, in sufficient amount to carry over to a decided alkaline reaction.

In some cases the sodium sulphide method for the second step is preferable.

The foregoing treatment after the sulphuric acid treatment may be hastened by going at once to the neutralization treatment without waiting for any separation whatever. This is somewhat more expensive since it involves neutralizing the excess sulphuric acid instead of removing it by washing. In this case there will be formed a peculiar emulsion layer and a top layer of slightly altered hydrocarbons. This top layer may be washed as noted above, added to the lower layer, and the combined reaction product washed as before.

Referring now to some examples of results: A California gas oil was oxidized by my vapor phase catalytic process and the oxidation product sulphonated and sulphated as above described. From a part of this product, I find the saponification number to be 21.03 and the acetyl value to be 5.7. Taking another portion of this sulphonated sulphated product, this was boiled for one hour with a 20% potassium hydroxide solution and the product then being analyzed gave a saponification value of substantially zero and an acetyl value of 27. The acetyl value being the measure of the alcohols present, it is apparent that the sulphates have been hydrolized as above outlined. Again, the same sulphonated-sulphated product was treated with ammonium hydroxide (concentrated solution), which was fed in until the alkaline side was reached. The reaction oil was then washed to remove the ammonium sulphate formed as a byproduct both from the free sulphuric acid and the organic sulphates present.

With this product, the main reaction was that of formation and of hydrolysis of the sulphates, as shown by the following sulphur and nitrogen determinations: sulphur .08%, nitrogen .07%. The product obtained by this process is of commercial value on account of attacking the unsaturated bond bodies and producing alkyl sulphates which may be hydrolyzed to alcohols.

One of the uses to which the product is applicable is that of insecticides and fungicides, although the products may be used for any desired industrial purpose. In my application Ser. No. 115,677, I disclosed methods for making chlorine and sulphur derivatives for insecticide use. I have found, however, that while by chemically introducing sulphur, chlorine or nitrogen into such oxidized hydrocarbons, their toxicity is increased; yet there remains a danger of "burning" or injuring the foliage of the plant or tree treated. I have now found that this may be largely overcome by removing or destroying the "unsaturated" character of the hydrocarbons or derivatives.

The present process greatly reduces or obviates this difficulty and the product will form an emulsion with the water and may be used without the use of added peptizing agents. For such insecticide or fungicide use, the product needs only the addition of water in the field where it is applied to bring the concentration down, for example, to 1 or 2%, since it is perfectly emulsifiable. Field tests have shown the desired toxicity toward insects, particularly aphis, without burning or injuring the foliage. In such use, the sulphur which is chemically introduced into the organic complexes increases their toxicity without injuriously affecting the foliage.

When used as an insecticide or fungicide, I may after sulphating and sulphonating introduce other atoms or groups, the reactive points being the sulphuric or sulphonic groups formed. Thus, the same sulphonated-sulphated product was treated with a sodium sulphide solution which gave a marked increase in the combined sulphur. After this treatment with sodium sulphide, the sulphur content was found to be 2.5%. Part of the sodium sulphide reacted to produce sulphur ethers in this treatment. The high molecular weight sulphur ethers remain in the oil by coaction with the other bodies present, such as the alcohols, thus increasing the toxicity of the mixture.

Instead of introducing sulphur, chlorine or nitrogen may be introduced into the oxidized derivatives, or combinations of them, or other toxic materials.

The advantages of the invention result from converting the unsaturated compounds into other chemical compounds, preferably of the alkyl sulphate type, which may be converted into a series of higher alcohols by hydrolysis. When used for insecticide or fungicide use, I am thus enabled to employ proper concentration to be used to kill the insect attacked, without burning of the foliage. This conversion of the unsaturated compounds may be used with or without the tying-in of toxic compounds; but I prefer to do both, as above set forth. Soaps of toxic metals, such as copper, lead, arsenic, etc., may be added and emulsified. The series of alkyl sulphates or of alcohols derived from the unsaturated compounds may be used for various industrial purposes. Other changes may be made without departing from my invention.

I claim:

1. In the preparation of insecticide and fungicide compounds, the steps consisting of sulphating the unsaturated compounds of a liquid partial oxidation product of aliphatic hydrocarbons, and hydrolyzing the sulphates.

2. In the preparation of insecticide and fungicide compounds, the steps consisting of sulphating the unsaturated compounds of a liquid partial oxidation product of aliphatic hydrocarbons, and then neutralizing the excess acid and hydrolyzing the sulphates.

3. In the preparation of insecticide and fungicide compounds, the steps consisting of sulphonating a partial oxidation product of aliphatic hydrocarbons containing artificially-introduced chemically-combined oxygen, and then hydrolyzing the sulphates.

4. In the preparation of insecticide and fungicide compounds, the steps consisting of sulphonating a partial oxidation product of aliphatic hydrocarbons containing artificially-introduced chemically-combined oxygen, hydrolyzing the sulphates and removing free sulphuric acid.

5. In the preparation of insecticide and fungicide compounds, the steps consisting of sulphonating a partial oxidation product of aliphatic hydrocarbons containing artificially-introduced chemically combined oxygen, hydrolyzing the sulphates and treating the same with alkali.

6. In the preparation of insecticide and fungicide compounds, the steps consisting of sulphonating a partial oxidation product of aliphatic hydrocarbons containing artificially-introduced chemically-combined oxygen, hydrolyzing the sulphates, removing free sulphuric acid and treating with alkali.

7. An insecticide or fungicide compound containing sulphonated and hydrolyzed oxygen derivatives of aliphatic hydrocarbons.

8. An insecticide or fungicide compound comprising as an essential ingredient a sulphonated and hydrolyzed partially oxidized aliphatic hydrocarbon.

9. An insecticide or fungicide compound comprising as an essential ingredient a sulphonated partially oxidized aliphatic hydrocarbon having chemically tied thereinto an inorganic material capable of reacting therewith and toxic to insects.

10. An insecticide or fungicide compound comprising as an essential ingredient a sulphonated and hydrolyzed partially oxidized aliphatic hydrocarbon having chemically tied thereinto an inorganic material capable of reacting therewith and toxic to insects.

11. In the method of treating a hydrocarbon mixture containing unsaturated bonds such as olefins, the steps comprising treating the same with sulphuric acid to sulphate the unsaturated bond bodies, and then neutralizing the excess acid and hydrolyzing the sulphates.

12. In the method of treating a hydrocarbon mixture containing unsaturated bonds such as olefins, the steps consisting of sulphating the same to form alkyl sulphates from the double bond bodies, then hydrolyzing the sulphates and forming alkali salts of the alcohols.

13. As a new composition of matter, a compound containing sulphonated and hydrolyzed oxygen derivatives of aliphatic hydrocarbons.

14. In the process of treating a mixture containing oxygen derivatives of aliphatic hydrocarbons having unsaturated bond bodies, the steps consisting of sulphating the same to produce alkyl sulphates, hydrolyzing the sulphates, and treating the same with alkali.

15. In the process of treating a mixture containing oxygen derivatives of aliphatic hydrocarbons having unsaturated bond bodies, the steps consisting of sulphating the unsaturated bonds, separating the sulphates from excess acid, and hydrolyzing the sulphates.

16. In the process of treating a mixture containing oxygen derivatives of aliphatic hydrocarbons having unsaturated bond bodies, the steps consisting of sulphating the unsaturated bonds, removing excess acid, hydrolyzing the sulphates, and treating the same with alkali.

17. In the method of treating a liquid mixture containing oxygen derivatives of aliphatic hydrocarbons of different molecular weights and including unsaturated bond bodies, the steps consisting of sulphating the same to form alkyl sulphates, and then separating the alkyl sulphates of different molecular weights and hydrolyzing them.

18. An insecticide or fungicide composition containing a sulphonated liquid mixture of oxygen derivatives of aliphatic hydrocarbons and a toxic material having insecticidal or fungicidal properties capable of admixture therewith, the hydrocarbon compounds being sufficient in quantity to spread the mixture in use.

19. An insecticide or fungicide composition containing a sulphonated partial oxidation product of aliphatic hydrocarbons in the range from alcohols to organic acids and a toxic material having insecticidal or fungicidal properties which is capable of having its killing efficiency and spreading characteristics increased by the admixture.

20. An insecticide or fungicide composition containing a sulphonated liquid mixture of oxygen derivatives of aliphatic hydrocarbons and an inorganic toxic material having insecticidal or fungicidal properties capable of admixture therewith, the hydrocarbon compounds being sufficient in quantity to spread the mixture in use.

21. An insecticide or fungicide composition containing a sulphonated partial oxidation product of aliphatic hydrocarbons in the range from alcohols to organic acids and an inorganic toxic material having insecticidal or fungicidal properties which is capable of having its killing efficiency and spreading characteristics increased by the admixture.

22. In the manufacture of insecticide or fungicide compounds, the steps consisting of sulphonating an oily partial oxidation product of aliphatic hydrocarbons in the range from alcohols to organic acids, and adding thereto a small percentage of a toxic material capable of having its killing efficiency and spreading characteristics increased by the said sulphonated product.

23. In the manufacture of insecticide or fungicide compounds, the steps consisting of sulphonating an oily partial oxidation product of aliphatic hydrocarbons in the range from alcohols to organic acids, and adding thereto a small percentage of an inorganic toxic material capable of having its killing efficiency and spreading characteristics increased by the said sulphonated product.

24. An insecticide or fungicide composition containing a compound resulting from a reaction between partially oxidized and sulphonated aliphatic hydrocarbons and a toxic material.

25. An insecticide or fungicide composition containing a compound resulting from a reaction between partially oxidized, sulphonated and hydrolyzed aliphatic hydrocarbons and a toxic material.

26. In the manufacture of insecticide and fungicide compounds, the steps consisting of sulphonating a partial oxidation product of aliphatic hydrocarbons containing an artificially-introduced chemically-combined oxygen, adding a toxic material thereto, and causing a reaction to occur between the oxidized material and the added toxic material.

27. In the manufacture of insecticide and fungicide compounds, the steps consisting of sulphonating a partial oxidation product of aliphatic hydrocarbons containing artificially-introduced chemically-combined oxygen, hydrolyzing the product and neutralizing excess sulphonic acid and adding thereto a toxic material capable of combining with said product.

JOSEPH HIDY JAMES.